March 20, 1951 H. WARP 2,545,981
REINFORCED PLASTIC SHEET
Filed Dec. 3, 1945

INVENTOR.
Harold Warp,
BY
Chritton, Wiles, Schroeder,
Merriam & Hofgren, Attys.

Patented Mar. 20, 1951

2,545,981

UNITED STATES PATENT OFFICE 2,545,981

REINFORCED PLASTIC SHEET

Harold Warp, Chicago, Ill., assignor to Flex-O-Glass, Inc., a corporation of Illinois Application December 3, 1945, Serial No. 632,538

7 Claims. (Cl. 18—56)

1

The invention relates to thin plastic sheets and has as a general object to provide a sheet of new and improved construction.

This invention deals with extremely thin plastic sheets by which is meant sheets less than .005 of an inch in thickness. Thin sheets of plastic have come into use as substitutes for glass in light admitting openings, usually as elements of a laminated product. Such products usually require two layers of the plastic sheet and further require the sheets to be run through a laminating process, all of which adds to the cost of the finished product and further produces a product which is not completely satisfactory for all purposes. Where the sheets are employed as substitutes for glass in light admitting openings, it is almost essential that the sheets be reinforced in order to provide the necessary strength.

It is an object of this invention, therefore, to provide a thin plastic sheet having reinforcing means upset from the material composing the sheet itself, this reinforcing means being on opposite sides of the sheet and running in opposite directions.

Another object is to provide a thin plastic sheet having on one side a plurality of parallel ribs or beads, and on the opposite side a plurality of parallel ribs or beads running at right angles to the ribs on the first side, each side of the sheet being smooth between the ribs.

Where the reinforced sheets are employed as substitutes for glass in light admitting openings, minimum interference with vision through the material is, of course, desirable. Where the reinforcing is opaque this interference may be considerable and even where, as here, the reinforcing is of transparent material it may still produce some interference, particularly when a reinforcing falls in the line of vision of each eye of the person looking through the material.

It is another object, therefore, to provide a reinforced plastic sheet in which, particularly, the reinforcings that are disposed vertically when the sheet is applied to a light admitting opening are so spaced that at no time will reinforcings fall in the line of vision of both eyes of a person looking through the material.

A further object is to provide a plastic sheet of a thickness in the range .002 to .005 of an inch and having on one side a plurality of parallel ribs and on the opposite side a plurality of parallel ribs disposed at right angles to the ribs on the first side, the ribs being spaced apart approximately one inch and being approximately .02 of an inch thick.

2

Still another object is to provide a thin plastic sheet having upset ribs on each side of the sheet, the ribs on each side being parallel and at right angles to the ribs on the opposite side, and a reinforcing filament embedded in each rib.

Other objects and advantages will become apparent from the following detailed description taken in connection with the accompanying drawings, in which.

Figure 1:
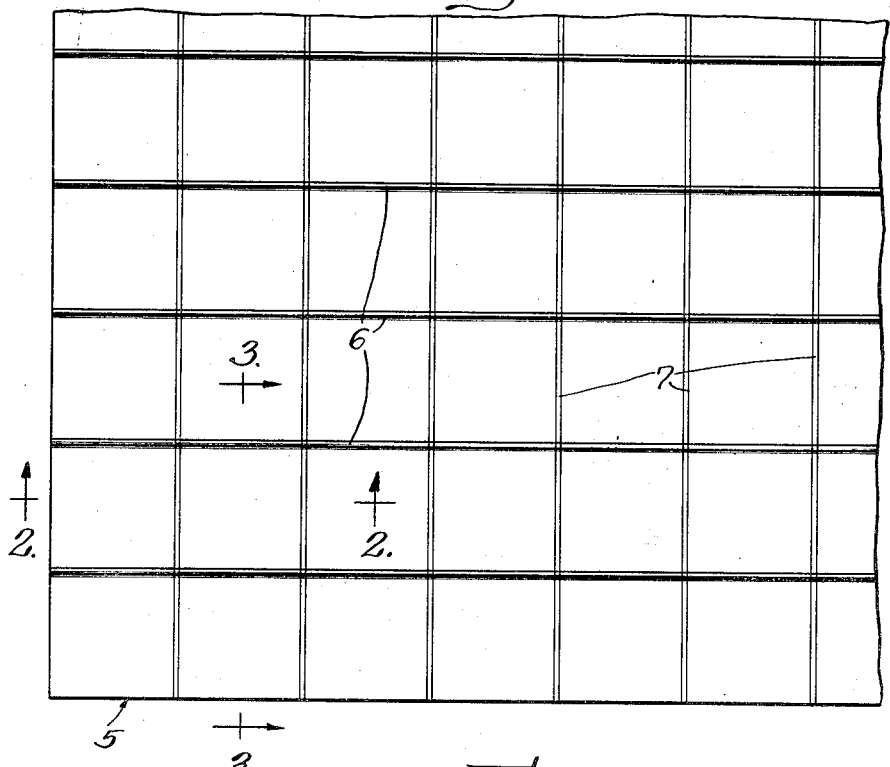
Fig. 1 is a plan view of a portion of a sheet embodying the features of this invention.

While the invention is no doubt susceptible of various modifications and alternative constructions, it is herein shown and will hereinafter be described in a preferred embodiment and one modification. It is not intended, however, that the invention is to be limited thereby to the specific constructions disclosed. On the contrary it is intended to cover all modifications and alternative constructions falling within the spirit and scope of the invention as defined in the appended claims.

In the drawings, the sheet is represented generally by the reference character 5 and may be composed of any suitable one of the plastics, preferably a tough material highly resistant to puncturing and to deterioration upon exposure to the sun, wind and rain, such, for example, as one of the vinyl compounds. The sheet 5 is in the range of .002 to .005 of an inch in thickness and preferably, though not necessarily, is transparent. It will be appreciated that where the product is to be employed in light admitting openings of dwellings for human beings a high degree of transparency will be desirable, but where the product is employed in greenhouses, hotbeds, and shelters for animals the product need not be transparent and, in fact, may desirably be translucent merely, so as to diffuse the light, or may even be colored so as to produce light having certain characteristics. The product should be highly transmissive of ultraviolet rays for, whatever its use, that characteristic is one of its outstanding advantages over glass.

The sheet 5 is reinforced and this reinforcing herein is of a character giving greatly added strength while at the same time interfering very little or not at all with sight through the finished product, but, above all, being incorporated as an incident to the manufacture of the sheet, as distinguished from incorporation by a separate and additional step as part of a laminated product. It is appreciated that reinforcing wires or strands have been embedded in comparatively thick sheets of plastic. It is not known, however, that thin sheets, by that is meant sheets having a thickness of .005 of an inch or less, have ever been successfully reinforced. Herein there is provided on one side or face of the sheet 5 a plurality of parallel ribs or beads 6 constituting the reinforcing means. These ribs or beads are composed of and upset from the material of the sheet and appear on one face or side only of the sheet. On the opposite side or face, the sheet 5 is formed with a plurality of parallelly extending beads or ribs 7. These ribs, like the ribs 6, are formed from the material composing the sheet and are upset from the sheet. The ribs 7 are disposed at right angles to the ribs 6 and thus the two sets of ribs reinforce the sheet in both directions. It is not necessary that the ribs extend parallel with the edges of the sheet, as shown, but may run in any direction so long as the right angular relationship of the two sets of ribs is maintained.

Figure 3:
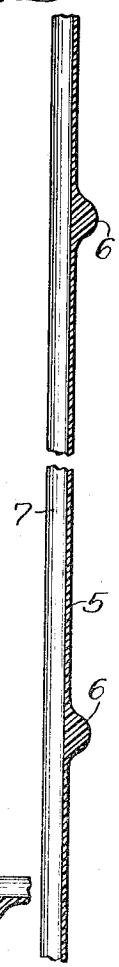
Fig. 3 is a view similar to Fig. 2 but taken in the opposite direction, namely, along the line 3—3 of Fig. 1.
Figure 2:
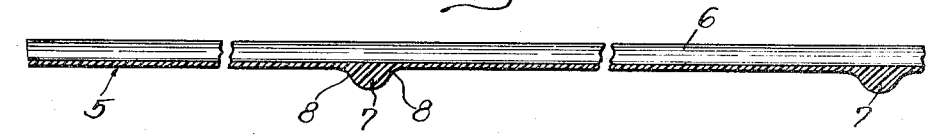
Fig. 2 is a greatly enlarged sectional view taken approximately along the line 2—2 of Fig. 1.

In order that the reinforcing ribs 6 and 7 may perform the maximum reinforcing function herein desired, namely, that of adding to the tensile strength of the sheet, as distinguished from stiffening the sheet, and yet be as inconspicuous as possible and also not produce other weaknesses in the sheet, the ribs 6 and 7 are given a width substantially greater than their thickness, that is, their projection outwardly from the plane of the sheet. To that end, the ribs 6 and 7 are given a generally semicircular shape, as best seen in Figs. 2 and 3, and thus have a width not less than twice the thickness. Were the ribs truly semicircular, however, a sharp corner would be formed between the sheet and the ribs at the juncture thereof. This would set up high stresses along the sharp corners thus formed and would tend to weaken the sheet along these lines. Accordingly, the ribs near their bases are formed with a curvature as at 8, which is the reverse of the curvature of the top and upper portions of the ribs. There results, of course, a gradual merging of the ribs with the sheet, which not only eliminates the setting up of high stresses present at sharp corners, but also gives added width and facilitates the manufacture of the sheet for the ribs can be more readily removed from the grooves of the apparatus in which they are formed.

Where the sheet is employed as a substitute for glass in light admitting openings in dwellings for humans, minimum interference with vision through the material is, of course, desirable. While the beads 6 and 7 herein are composed of the same material forming the sheet and thus, under the circumstances here being specifically considered, would be composed of transparent material, nevertheless there would be some loss of transparency if for no other reason than the increased thickness of the product at the ribs. Should the ribs be so spaced that a rib is in the direct line of vision of each eye of a person looking through the sheet, a reduction in vision would result. Herein the beads are so spaced that such interference with the vision of both eyes is rendered a substantial impossibility.

It has been found by tests conducted for that purpose that the spacing of the pupils of the eyes of human beings ranges from two and one-fourth inches to two and three-fourths inches. It follows, therefore, that if the ribs were given a spacing of one-fourth of an inch, or of a half an inch, or of two and one-fourth, two and one-half, or two and three-fourths inches it would be possible for two of the ribs to be in the direct line of vision of the eyes of a person looking through the material. However, if the beads are given a spacing of one inch, one and one-half, two, or from three inches upwardly, this possibility of interference with the sight of both eyes is eliminated. It is to be appreciated that the condition herein assumed is with the head held in normal, upright, vertical position and with the sheet so mounted that one set of ribs is parallel with the line drawn through the pupils of the eyes and with the other set of ribs, of course, extending at right angles to such a line. By way of example, and as viewed in Fig. 1, this could mean that the ribs 6 corresponded to the ribs parallel with a line through the pupils of the eyes and that the ribs 7 corresponded to the ribs at right angles to that line. So long as the ribs 6 remain parallel with the line drawn through the pupils of the eyes, the spacing of these ribs is not so important, but the spacing of the ribs 7 is important. Herein both the ribs 6 and the ribs 7 are shown spaced apart approximately one inch and have a thickness in the order of .02 of an inch and a width in excess of .04 of an inch. It will be appreciated that either or both the spacing of the ribs or the dimensions thereof may be varied so long as the spacing of the ribs is maintained within the limitations above set forth, particularly if they are so varied that change in spacing is compensated for by change in dimensions of the ribs. Thus if the spacing of the ribs is increased the dimensions thereof should also be increased, and vice versa.

The spacing of the beads and the dimensions thereof should bear a definite relationship not merely to maintain the same degree of reinforcing of the material but also for the reason about to be made known. For satisfactory results, the dimensions of the beads should be such that they equal in volume the amount of material which is displaced from the surfaces between the beads as the extruded sheet is reduced in thickness by passage between opposed surfaces having grooves formed therein, as hereinafter described. It will be readily apparent that, if a sheet is reduced in thickness the same amount, more material will be displaced the larger the area between the beads, and hence the volume or cross sectional area of the beads must also be larger so as to be capable of taking this increased volume of displaced material. When the beads are spaced more closely together, the converse is true and the beads can have smaller dimensions. It also follows that the thickness of the sheet as initially extruded must bear a relationship to both the eventual thickness of the finished sheet and the spacing and dimensions of the reinforcing beads.

Certain advantages of the material, such as the fact that the material is reinforced without having the reinforcings materially impair transparency or interfere with sight through the material, have been pointed out in the above description. A further advantage of this construction is that the space between the ribs on either side is not interrupted but is perfectly smooth, thereby facilitating cleaning of the sheet, which might become a tedious and difficult job were the sheet to be formed into one inch squares. Preferably the sheet is mounted with the ribs 7 on the outside, thereby providing uninterrupted vertical channels giving rain striking the material an opportunity to flow downwardly freely and thus wash the material.

The product will be made by extruding the material in a plastic state, so made either by heating of the material or by the use of a solvent as the nature of the plastic material employed requires, onto a moving surface which has parallel grooves formed therein so as to form the beads 6, for example, and then applying to the extruded material a second surface having grooves formed therein disposed at right angles to the grooves in the first surface so as to form the beads 7. These surfaces will, of course, have such spacing as to squeeze the extruded material to the desired thickness and the thickness at which the sheet is initially extruded must be coordinated with the final thickness and with the spacing and dimension of the beads, as above pointed out. Obviously these surfaces may take the form of large rollers, of belts passed between rollers to obtain the necessary pressure, or of a belt and a roller or plurality of rollers. Heretofore sheets of the thickness herein specified have not been successfully produced with the very smooth surfaces required for maximum transparency. Attempts to employ opposed polished surfaces have been unsuccessful because the surfaces were unable to grip the sheets sufficiently to feed them through the machine. The provision of the reinforcing ribs therefore produces a result over and above the mere reinforcing of the sheet, namely, the ribs make possible the employment of highly polished surfaces in the manufacture of this thin sheet and thus make possible the production of a thin sheet having the degree of smoothness of its surfaces required for high transparency.

Still another advantage is believed to result from the formation of the sheets in the manner described. It is believed that during the formation of the sheet by the application of pressure through the medium of the opposed surfaces there will be a flow of the material on the upper face, as viewed in Fig. 1, toward and into the formation of the reinforcing ribs 6 and that, likewise, there will be a flow of the material on the lower side of the sheet, as viewed in Fig. 1, toward and into the formation of the ribs 7. This flow or stretching of the material is believed to produce some orientation of the molecules with the resultant greatly enhanced strengthening of the material as is commonly known. Herein the orientation of the molecules in one half or one side of the sheet will be in one direction, while the orientation of the molecules in the remaining half or side of the sheet will, of course, be in the opposite direction thereby strengthening and toughening the sheet in both directions.

Figure 4:
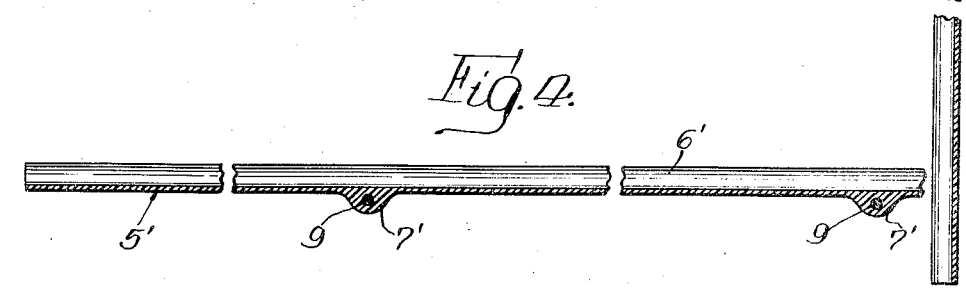
Fig. 4 is a view similar to Fig. 2 showing a modified form of the sheet.

Fig. 4 discloses a modified form of the invention. In the form disclosed in that figure, the sheet 5' has the same dimensions as that disclosed in Figs. 1 to 3 and also is still formed on opposite sides with ribs 6' and 7', the ribs on any one side being parallel and disposed at right angles to the ribs on the opposite side. Each of the ribs 6' and 7' has in this form embedded therein an additional reinforcing filament 9 which may be either of metal, fiber or plastic. The filament 9 is readily incorporated in the ribs 6' and 7' by placing the filament in the groove provided in the opposed surfaces employed in the making of the sheet. As clearly seen in Figure 4, the cross-sectional area of the filament 9 is very small and is considerably smaller relatively when compared with the cross-sectional area of the bead.

I claim as my invention:

1. An article of manufacture comprising a flexible sheet composed of one of the plastics having a thickness in the range .002 to .005 of an inch, a plurality of parallel, continuous beads formed on one side of the sheet from the same material as the sheet, said beads being spaced apart approximately one inch and each having a thickness of approximately .02 of an inch and a width twice the thickness, and a plurality of similar beads formed on the opposite side of the sheet and extending substantially at right angles to the first mentioned beads.

2. An article of manufacture comprising a cast, flexible sheet composed of one of the plastics having a thickness in the range .002 to .005 of an inch, a plurality of parallel, continuous beads formed on one side of the sheet composed of the same material as the sheet and each having a thickness of approximately .02 of an inch and a width at the base of twice the thickness, and a plurality of similar beads formed on the opposite side of said sheet and extending at right angles to the first mentioned beads.

3. An article of manufacture comprising a flexible sheet composed of one of the plastics having a thickness less than .005 of an inch, a plurality of parallel continuous, homogeneous reinforcing beads formed on one side of the sheet of the same material as the sheet and having a thickness not less than four times the thickness of the sheet, and a plurality of similar beads formed on the opposite side of the sheet disposed at right angles to the first mentioned beads.

4. An article of manufacture comprising a very thin flexible sheet composed of one of the plastics and a plurality of reinforcing ribs on both sides of the sheet, the ribs on any one side of the sheet being homogeneous, parallel and continuous and disposed at right angles to the ribs on the opposite side of the sheet, and the ribs being composed of and upset from the material of the sheet, the beads on at least one side of the sheet being spaced not less than an inch, nor any spacing larger than an inch any multiple of which would fall in the range of two and one-quarter to two and three-quarters of an inch.

5. An article of manufacture comprising a flexible, transparent sheet composed of one of the plastics, the sheet having a thickness falling in the range .002 to .005 of an inch, a plurality of continuous and homogeneous beads formed on each side of the sheet from the material composing the sheet with the beads on any one side being parallel with one another and disposed at right angles to the beads on the opposite side of the sheet, the surfaces of the sheet intermediate the beads forming parallel planes so as not to impair the transparency of the sheet.

6. An article of manufacture comprising a very thin flexible sheet composed of one of the plastics and homogeneous beads formed on opposite sides of the sheet from the material of the sheet, the beads on any one side of the sheet being continuous and parallel with one another but extending at right angles to the beads on the opposite side of the sheet, and the molecules composing the material of the sheet being oriented in one linear direction on one side of the sheet and in a right angular linear direction on the opposite side of the sheet.

7. An article of manufacture comprising a very thin flexible sheet composed of one of the plastics, a plurality of parallel, continuous beads formed on one side of the sheet from the same material as the sheet, a plurality of parallel, continuous beads formed on the opposite side of the sheet and disposed at right angles to the first mentioned beads, and a reinforcing filament embedded in one or more of the beads, said filament having a cross-sectional area considerably smaller than the cross-sectional area of the bead.

HAROLD WARP.

REFERENCES CITED

The following references are of record in the file of this patent:

UNITED STATES PATENTS

| Number | Name | Date |
|---|---|---|
| 720,138 | Hartung | Feb. 10, 1903 |
| 1,580,287 | Colle et al. | Apr. 13, 1926 |
| 1,706,524 | Farr | Mar. 26, 1929 |
| 1,932,821 | Henkel | Oct. 31, 1933 |
| 1,933,616 | Canon | Nov. 7, 1933 |
| 2,033,204 | Mrazek | Mar. 10, 1936 |
| 2,046,886 | Strain | July 7, 1936 |
| 2,304,886 | Conklin et al. | Dec. 15, 1942 |
| 2,330,282 | Hazeltine et al. | Sept. 28, 1943 |